(12) United States Patent
Machida

(10) Patent No.: US 7,656,562 B2
(45) Date of Patent: Feb. 2, 2010

(54) IMAGE READING APPARATUS

(75) Inventor: Takashi Machida, Niiza (JP)

(73) Assignee: Canon Denshi Kabushiki Kaisha, Chichibu-Shi, Saitama-Ken (JP)

( * ) Notice: Subject to any disclaimer, the term of this patent is extended or adjusted under 35 U.S.C. 154(b) by 481 days.

(21) Appl. No.: 11/365,041

(22) Filed: Feb. 28, 2006

(65) Prior Publication Data

US 2006/0193015 A1 Aug. 31, 2006

(30) Foreign Application Priority Data

Feb. 28, 2005 (JP) ............................. 2005-054771

(51) Int. Cl.
*H04N 1/31* (2006.01)

(52) U.S. Cl. ................. 358/461; 358/448; 358/474; 358/406

(58) Field of Classification Search ................ 358/461, 358/448, 474, 406
See application file for complete search history.

(56) References Cited

U.S. PATENT DOCUMENTS

| | | | | |
|---|---|---|---|---|
| 5,280,368 A | * | 1/1994 | Fullerton | 358/474 |
| 6,101,283 A | * | 8/2000 | Knox | 382/254 |
| 6,323,933 B1 | * | 11/2001 | Anzai | 355/23 |
| 7,016,090 B2 | * | 3/2006 | Sekine | 358/498 |
| 7,110,148 B2 | * | 9/2006 | Hasegawa et al. | 358/474 |
| 7,457,006 B2 | * | 11/2008 | Wilsher et al. | 358/461 |
| 2002/0033968 A1 | * | 3/2002 | Chen | 358/406 |
| 2005/0030596 A1 | * | 2/2005 | Chen et al. | 358/474 |
| 2007/0223061 A1 | | 9/2007 | Tanaka et al. | 358/497 |
| 2007/0223062 A1 | | 9/2007 | Tanaka et al. | 358/497 |

FOREIGN PATENT DOCUMENTS

| | | |
|---|---|---|
| JP | 62-154950 | 7/1987 |
| JP | 5-74072 | 3/1993 |
| JP | 2003-23531 | 1/2003 |
| JP | 2004-48436 | 2/2004 |

* cited by examiner

*Primary Examiner*—Benny Q Tieu
*Assistant Examiner*—Paul F Payer
(74) *Attorney, Agent, or Firm*—Fitzpatrick, Cella, Harper & Scinto

(57) ABSTRACT

The invention is related to an image reading apparatus which has a conveying unit which conveys an original (D), a first reading unit including a first reading section which reads one side of the original (D) conveyed by the conveying unit, a second reading unit (12) including a second reading section which reads the other side of the original conveyed by the conveying unit; and a moving mechanism (30) which displaces relative positions of the first reading unit and the second reading unit in an original conveyance direction by using driving force of a motor for driving the conveying unit.

2 Claims, 9 Drawing Sheets

IMAGE READING APPARATUS

BACKGROUND OF THE INVENTION

1. Field of the Invention

The present invention relates to an image reading apparatus which reads image information of an original while changing relative positions of the original and a reading sensor.

2. Description of the Related Art

In general, an image reading apparatus of this type which illuminates an original by a light source and reads an original image by a line image sensor or the like. However, due to the presence of a unevenness in light quantity of the light source and a unevenness in sensitivity of the line image sensor, shading correction must be performed by reading a white color reference member.

In reading of an original, in order to detects a boundary between an original and a background, to detect skew feed of the original, and to reduce transparent seeing of an image on the rear side of the original, the color of a member facing the line image sensor must be made a color except for white (in general, black).

A conventional image reading apparatus will be described below with reference to FIG. 6. In the image reading apparatus in FIG. 6, image information of both sides of an original D by reading units 111 and 112 in which line image sensors have been built. Before the image reading apparatus reads the original D, rotating arms 131 and 132 to which color reference members 121 and 122 have been fixed are rotated, the color reference members 121 and 122 are protruded from frames 141 and 142 and inserted between the reading units 111, 112 and the frames 141, 142. Thereafter the reading units 111 and 112 read the front surfaces of the color reference members 121 and 122. In this manner, correction data to perform shading correction of an output from the line image sensor is stored for each pixel.

Thereafter, in the image reading apparatus, the rotating positions of the rotating arms 131 and 132 are returned to normal positions. And images of original D are read by the reading units 111 and 112. In this case, in reading of the original D, with reference to correction data stored in advance, shading correction of the output from the line image sensor is performed.

Some image reading apparatus performs shading correction by using a roller-shaped color reference member without using a rotating arm (for example, see Japanese Patent Application Laid-open No. 2003-23531). The image reading apparatus rotates a color reference member in a reading operation of the color reference member to moderate an influence to correction data by scratches and stains on the color reference member.

However, in an image reading apparatus shown in FIG. 6, spaces are required to rotate the rotating arms 131 and 132. Since the apparatus must assure the space, a product disadvantageously increases in size.

Parts related to the rotating arms 131 and 132 and the rotating mechanism for the rotating arms increase the number of parts. For this reason, a parts cost and an assembly cost disadvantageously increase to prevent the price from being lowered.

The color reference members 121 and 122 are inserted into or removed from an original conveyance path. For this reason, the color reference members 121 and 122 are gradually scratched or stained in inserting and removing processes. When the scratches and the stains are conspicuous, cleaning and replacing of the color reference members 121 and 122 must be performed. However, since the color reference members 121 and 122 are fixed to the rotating arms 131 and 132, respectively, the rotating arms must be swung once in replacement and protruded form a frame. For this reason, the replacement is poor in operability.

In the image reading apparatus disclosed in Japanese Patent Application Laid-open No. 2003-23531, shading is less influenced even though the color reference member is scratched or stained. However, since the color reference member is large in size, a reduction in size of the product is limited.

SUMMARY OF THE INVENTION

It is an object of the present invention to reduce in size of an apparatus and to easily perform cleaning and replacement of a color reference member.

A typical configuration according to the present invention to achieve the above object, The configuration has: a conveying unit which conveys an original; a first reading unit including a first reading section which reads one side of the original conveyed by the conveying unit; a second reading unit including a second reading section which reads the other side of the original conveyed by the conveying unit; a moving mechanism which displaces relative positions of the first reading unit and the second reading unit in an original conveyance direction by using driving force of a motor which drives the conveying unit.

With the above configuration, additional motor to displace the relative positions of the first reading unit and the second reading unit in the original conveyance direction and additional drive transmitting mechanism attached to the additional motor are not necessary. Therefore, a space for arranging the motor and the drive transmitting mechanism can be reduced, and the apparatus can be reduced.

DESCRIPTION OF THE PREFERRED EMBODIMENT

An embodiment of the present invention will be described below. In this explanation, a schematic configuration and an operation of an image reading apparatus, a configuration about reading of a color reference member, an operation about reading of the color reference member, and a configuration about an exchanging/cleaning state of the color reference member will be described in the order named.

(Schematic Configuration and Operation of Image Reading Apparatus)

Figure 1:
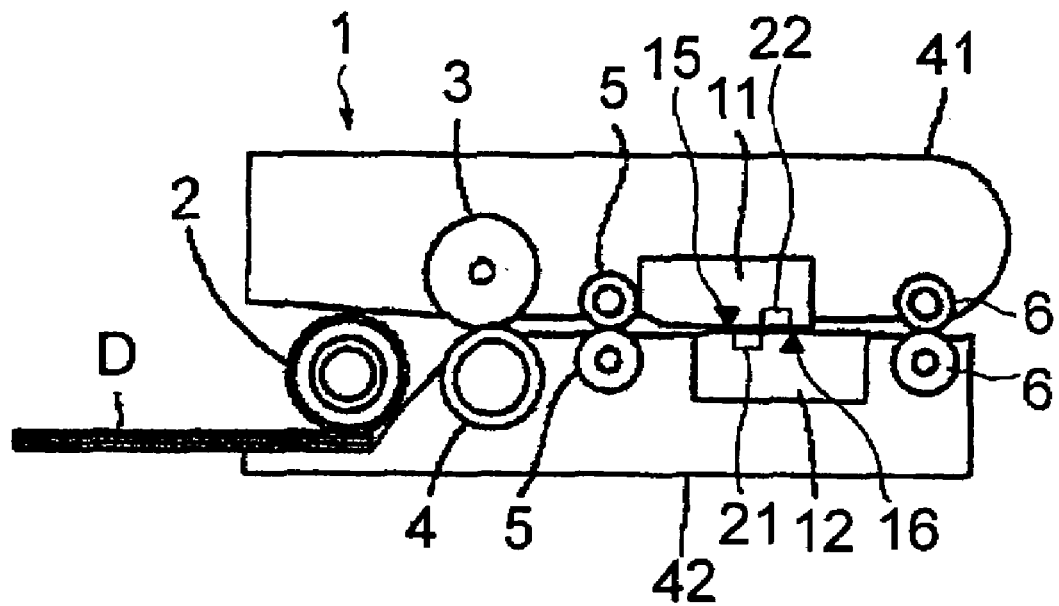
FIG. 1 is an entire schematic diagram of an image reading apparatus 1.

A schematic configuration of an image reading apparatus will be described below. FIG. 1 is an entire schematic diagram of an image reading apparatus 1. The configuration is a schematic configuration, and does not limit the invention.

As shown in FIG. 1, the image reading apparatus 1 according to the embodiment has a pickup roller 2 which picks up an original D, a feeding roller 3 which feeds the original D picked up by the pickup roller 2 into the apparatus; a separation roller 4 which separates picked originals D one by one; registration rollers 5 arranged as a pair of registration rollers to convey the original D while correcting skew feeding of the original D, a reading unit (first reading unit) 11 which reads image information on the upper side of the original D, a reading unit (second reading unit) 12 which reads image information on the lower side of the original D, and conveyance rollers 6 arranged as a pair of conveyance rollers on the downstream side of the reading units 11 and 12.

The conveying means such as the registration rollers 5 and the conveyance rollers 6 related to conveyance of an original are driven by a motor (not shown) serving as a driving means. Driving force from the motor is transmitted by a driving force transmitting mechanism (not shown).

The image reading apparatus 1 is constituted by an upper frame 41 and a lower frame 42. The reading unit 11 is fixed on the upper frame 41, and the reading unit 12 is arranged on the lower frame 42 such that the reading unit 12 can be horizontally moved in a sub scanning direction (same direction as the original conveyance direction).

With the above configuration, the image reading apparatus 1 performs the following operation in reading of the images of the original D. As will be described below, a color reference member is read by the reading sections of the reading units 11 and 12 to store shading correction data for each pixel.

Thereafter, the originals D are taken into the apparatus by the pickup rollers 2 and the feeding roller 3 and separated from each other by the separation roller 4 one by one. The original D is held between the registration rollers 5 and the conveyance rollers 6 and conveyed (sub scanned) to read image information of the two sides of the image in a main scanning direction (direction perpendicular to an original conveyance direction) by the reading units 11 and 12. In the reading, outputs from the reading sections of the reading units 11 and 12 are subjected to shading correction with reference to the correction data described above. After the images are read, the original D is discharged out of the apparatus while being held and conveyed between the pair of conveyance rollers 6.

(Configuration Related to Reading of Color Reference Member)

A configuration related to a color reference member will be described below with reference to FIGS. 2 to 4.

Figure 2A:
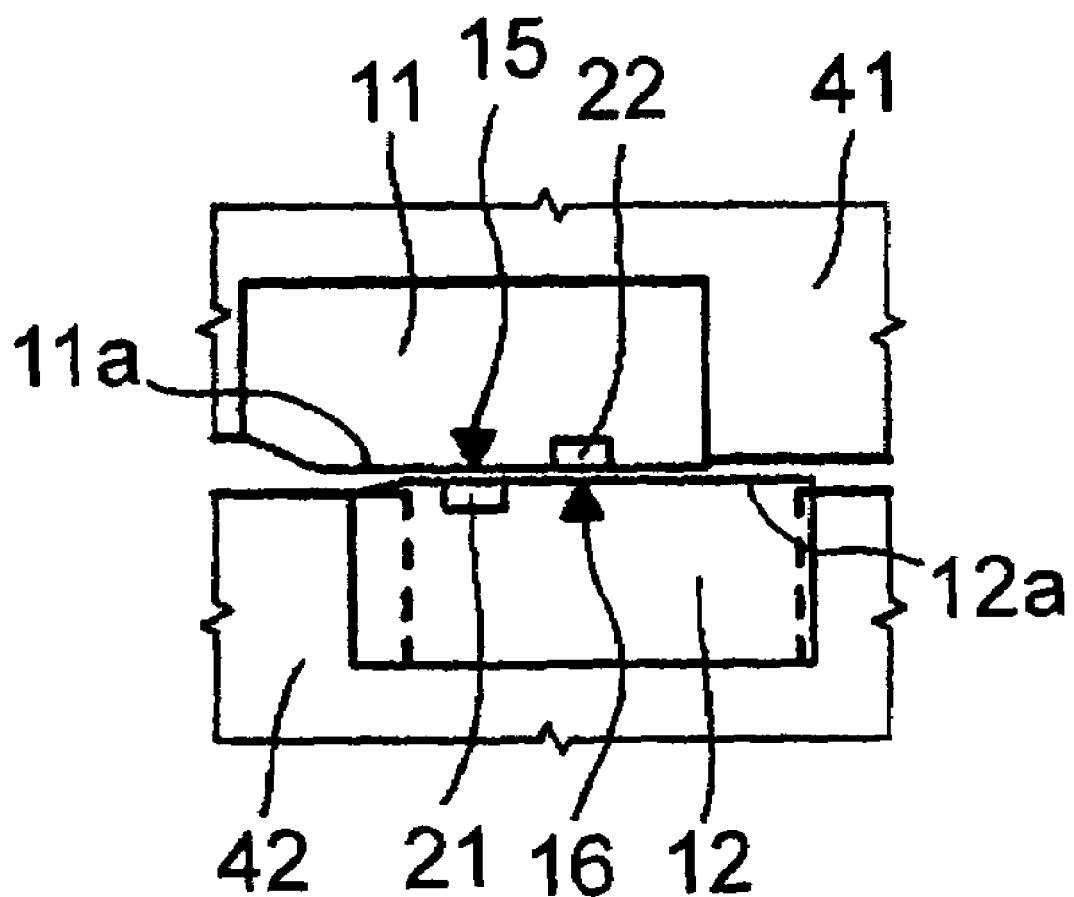
FIGS. 2A and 2B are enlarged sectional diagrams of reading units 11 and 12.
Figure 2B:
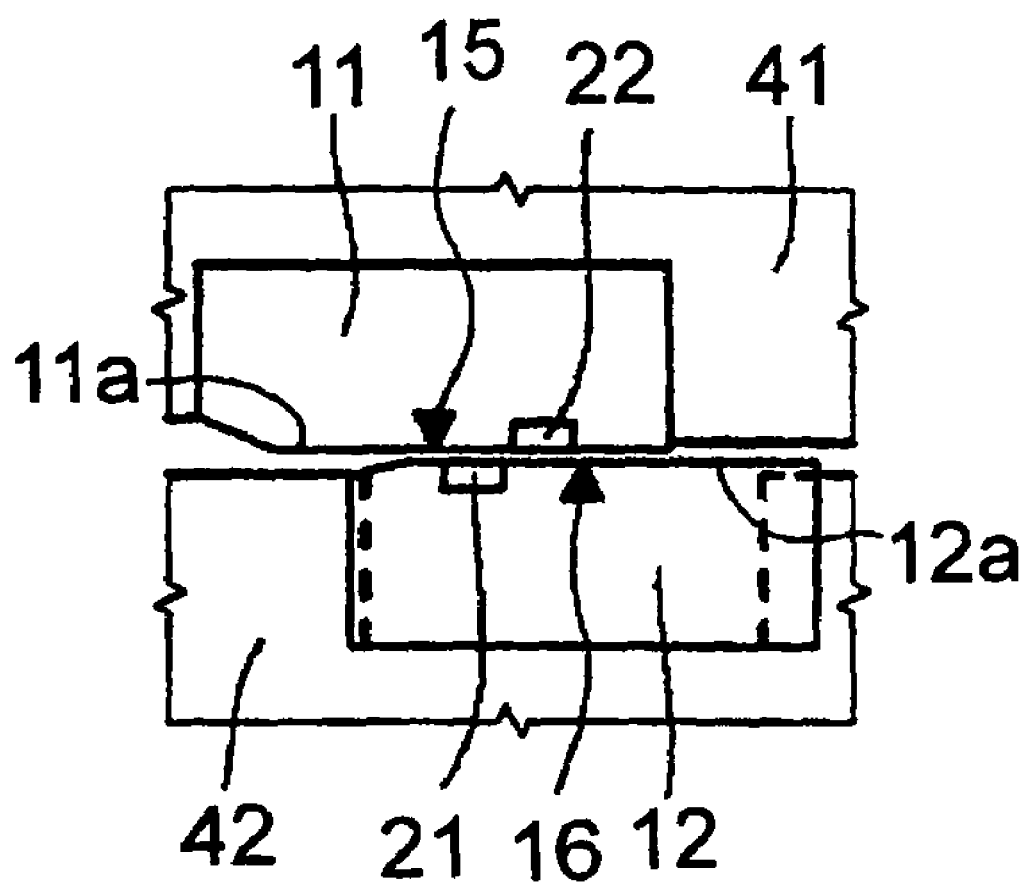

FIGS. 2A and 2B are enlarged sectional diagrams of the reading units 11 and 12. FIG. 2A shows a state of the color reference member in a reading state, and FIG. 2B shows a state of an original in a conveying state.

As shown in FIGS. 2A and 2B, a reading section (first reading section) 15 such as a line image sensor which reads image information and a white color reference member (first color reference member) 22 are integrally arranged in the reading unit 11. On the other hand, a reading section (second reading section) 16 such as a line image sensor which reads image information and a white color reference member (second color reference member) 21 are integrally arranged in the reading unit 12.

On an image reading surface 11a serving as a surface for reading an original on the lower surface of the reading unit 11, the reading section 15 and the color reference member 22 are arranged in the order named along the original conveyance direction. On the other hand, on an image reading surface 12a serving as a surface for reading an original on the upper surface of the reading unit 12, the color reference member 21 and the reading section 16 are arranged in the order named along the original conveyance direction. An interval between the reading section 15 and the color reference member 22 on the image reading surface 11a is set to be equal to an interval between the color reference member 21 and the reading section 16 on the image reading surface 12a. The image reading surface 11a and the image reading surface 12a are parallel to each other.

In other words, the reading section 15 and the color reference member 21 are parallel to each other in a main scanning direction, and the reading section 16 and the color reference member 22 are parallel to each other in the main scanning direction. The reading section 15 and the reading section 16 are arranged at axially symmetric positions with respect to an axis in the main scanning direction within the original conveyance path, and the color reference member 21 and the color reference member 22 are arranged at axially symmetric positions with respect to the axis in the main scanning direction within the original conveyance path.

In this manner, the reading sections and the color reference members are integrally mounted in the reading units, and the reading unit 11 and the reading unit 12 are designed such that the reading section of one reading unit reads the color reference member of the other reading unit. That is, for example, a fitting member dedicated to a color reference member such as a conventional swing arm is not required. For this reason, the number of parts must be considerably reduced. Furthermore, since a space for arranging a conventional fitting member can be reduced, the apparatus can be reduced in size.

Figure 3A:
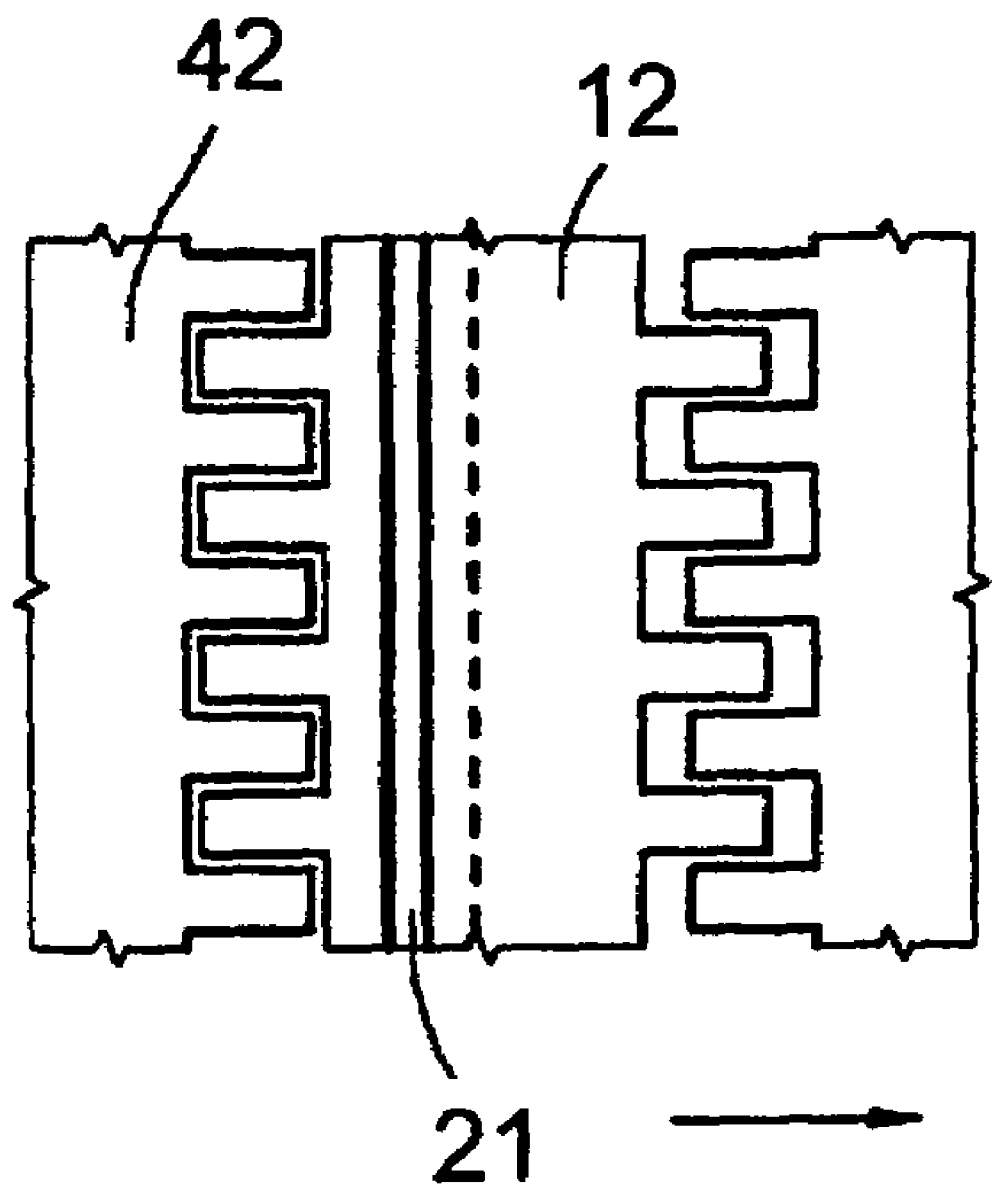
FIGS. 3A and 3B are diagrams obtained when the reading unit 12 is viewed from an original conveyance surface side.
Figure 3B:
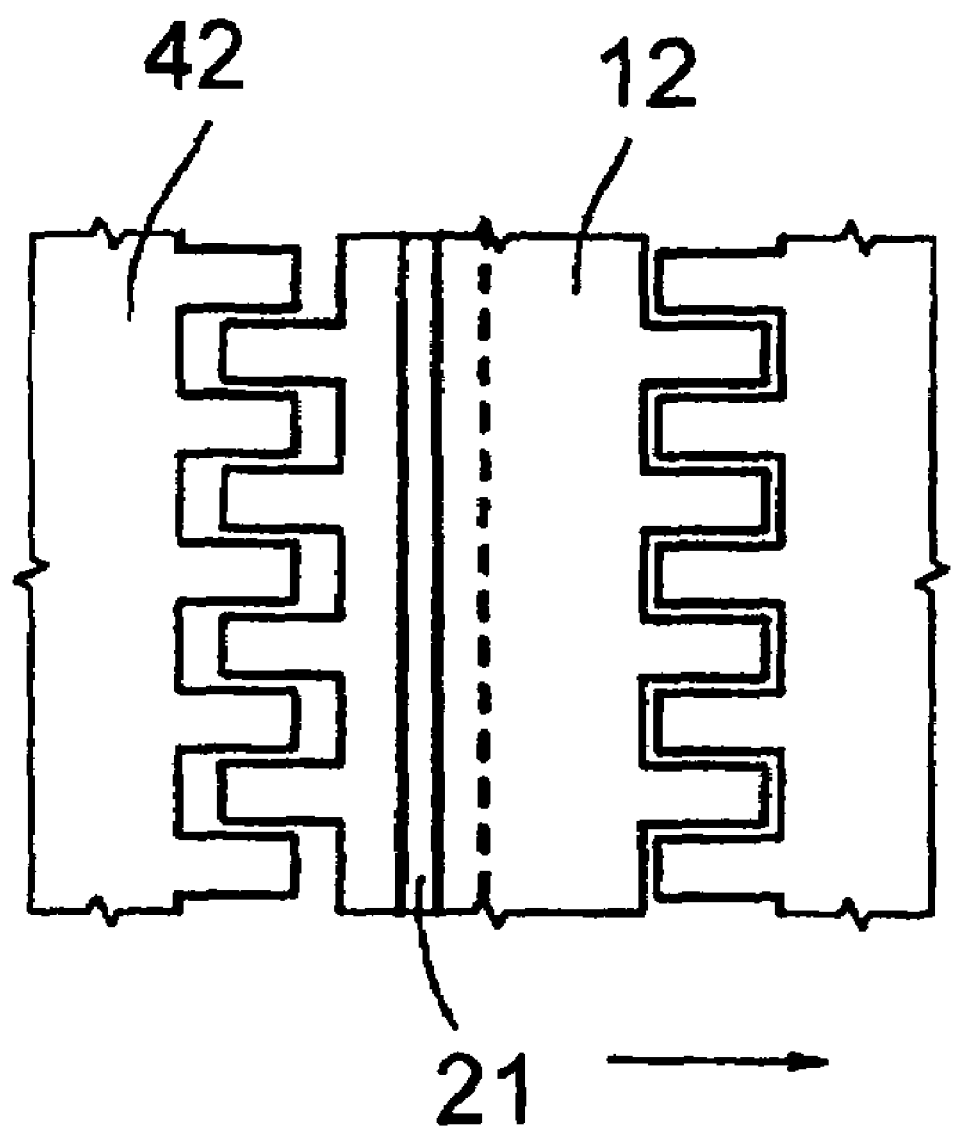

FIGS. 3A and 3B are diagrams obtained when the reading unit 12 is viewed from an original conveyance surface side. Directions indicated by arrows in FIGS. 3A and 3B are original conveyance directions. FIG. 3A shows a state of a color reference member 21 in a color reference reading state, and FIG. 3B shows a state of color reference member 21 in a conveying state. The reading section 16 is arranged at a position indicated by a dotted line.

As shown in FIGS. 3A and 3B, when the reading unit 12 is viewed from the original conveyance surface side, both ends of the reading unit 12 in the original conveyance directions are comb-shaped. The lower frame 42 is formed in the shape of a rib to be meshed with the reading unit 12. The length of each tooth of the comb shape (length of one unit of the teeth of the comb shape) is set to be larger than a moving length of the reading unit 12. For this reason, the reading unit 12 and the lower frame 42 are designed such that the comb shapes are always meshed with each other.

In this manner, on the one hand the comb shapes are always meshed with each other, on the other hand the leading end of the original D has a linear shape in the main scanning direction. For this reason, even though a comb-shaped gap is formed between the lower frame 42 and the reading unit 12, the leading end of the original D does not fall into the gap. And the original D can be smoothly conveyed.

Figure 4A:
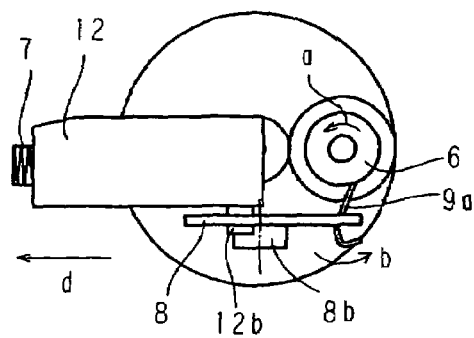
FIGS. 4A and 4B are diagrams showing the configuration of a moving mechanism 30 of the reading unit 12.
Figure 4A:
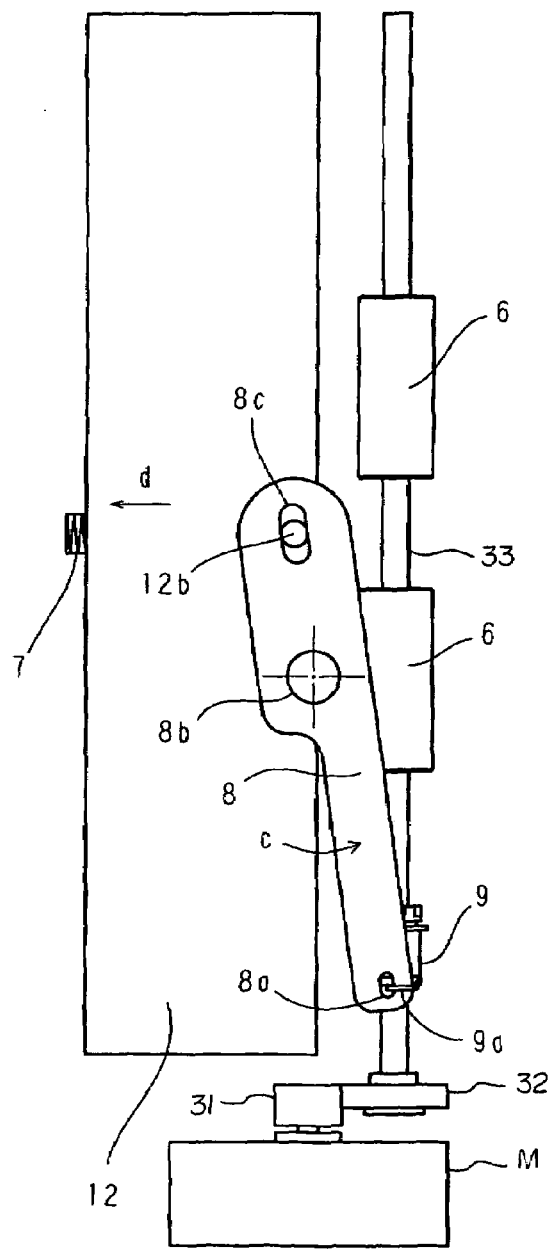
Figure 4B:
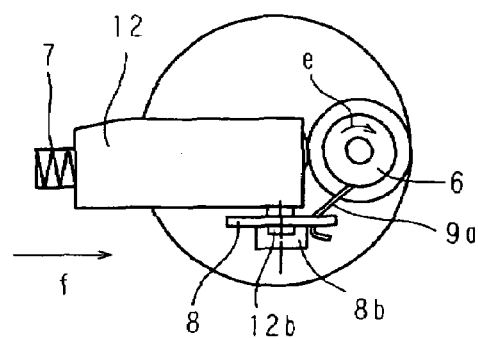
Figure 4B:
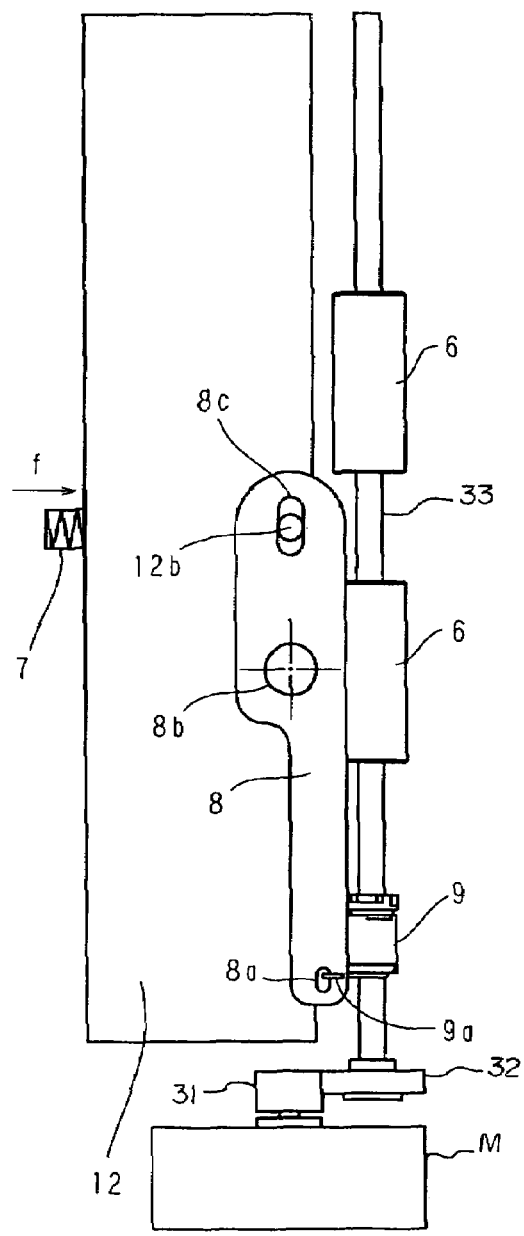

FIGS. 4A and 4B are diagrams showing configurations of A moving mechanism 30 of the reading unit 12. FIG. 4A shows a color reference member reading state, and FIG. 4B shows an original conveying and reading state. An upper part of each diagram is a side view of the moving mechanism 30, and the lower part is a bottom view of the moving mechanism 30.

As shown in FIG. 4, the moving mechanism 30 of the reading unit 12 has a one-way clutch 9 attached to the shaft of the conveyance roller 6, a moving arm 8 which transmits driving force from the one-way clutch 9 to the reading unit 12, and a biasing means 7 such as a compression spring which applies a force to the reading unit 12 toward the conveyance rollers 6.

The moving arm 8 has a round hole 8a with which an engaging portion 9a of the one-way clutch 9 engages and a long hole 8c in which a connecting projection 12b of the reading unit 12 is fitted. The moving arm 8 swings about a swinging shaft 8b. The one-way clutch 9 is configured such that driving force is transmitted by the one-way clutch 9 to the moving arm 8 only when the rotating shaft of the conveyance roller 6 rotates counterclockwise (direction of an arrow a in FIG. 4A) in FIGS. 4A and 4B. And the driving force is not transmitted by the one-way clutch 9 when the rotating shaft rotates clockwise (direction of an arrow e in FIG. 4B).

With the configuration, the conveyance roller 6 is counterclockwise (direction of the arrow a) rotated in FIGS. 4A and 4B, the one-way clutch 9 transmits driving force of the rotating shaft of the conveyance roller 6 to the engaging portion 9a, and the engaging portion 9a draws the round hole 8a of the moving arm 8 toward the conveyance rollers 6 (direction of an arrow b). When the round hole 8a of the moving arm 8 is drawn to swing the moving arm 8 about the swinging shaft 8b in a direction of an arrow c), the long hole 8c being opposite the round hole 8a behind the swinging shaft 8b compresses the connecting projection 12b of the reading unit 12 in a direction of an arrow d. In this manner, the reading unit 12 moves in the direction of the arrow d against the force to be applied by the biasing unit 7.

In contrast to this, when the conveyance roller 6 rotates clockwise in FIGS. 4A and 4B (direction of the arrow e), the one-way clutch 9 does not transmit the driving force from the rotating shaft of the conveyance roller 6 to the engaging portion 9a. For this reason, a force is not applied to the engaging portion 9a and the moving arm 8 does not move. And the reading unit 12 is pressed to terminal position in a direction of an arrow f by a force of the biasing unit 7.

(Operation Related to Reading of Color Reference Member)

With the above configuration, in a reading operation of a color reference member performed before an image reading operation, a motor M which drives the conveyance roller 6 is reversely rotated (rotation in the reverse direction of the rotating direction in the image reading state). With the rotation of the motor M, a shaft 33 to which the conveyance roller 6 is fixed is rotated through a gear 31 of the motor M and a gear 32 at an end of the shaft 33. At this time, the reading unit 12 begins to horizontally move in the reverse direction of the original conveyance direction by the operations of the one-way clutch 9 and the moving arm 8 described above, the reading unit 12 moves to a position (first relative position) where the reading section 15 is opposed to the color reference member 21 and the reading section 16 is opposed to the color reference member 22 (see FIGS. 2A, 3A, and 4A).

In this case, the reading section 15 is opposed to the color reference member 21, the reading section 16 is opposed to the color reference member 22, and sensor effective areas of the sensor light-receivers of the reading sections 15 and 16 are covered with the color reference members 21 and 22. At this time, the reading sections 15 and 16 read the color reference members 21 and 22. At this time, the reading sections 15 and 16 reads the color reference members 21 and 22, respectively. At a result, data to perform shading correction to outputs from the line image sensors of the reading sections 15 and 16 is stored in each pixel. Thereafter, the image reading apparatus rotates the motor M in a forward direction (rotation in an image rotating state). The rotation of the motor M rotates the shaft 33 to which the conveyance roller 6 is fixed through the gear 31 of the motor M and the gear 32 at the end of the shaft 33. At this time, the reading unit 12 begins to horizontally move in the original conveyance direction by the operations of the one-way clutch 9 and the moving arm 8 described above, and the reading unit 12 moves to a position (second relative position) where the reading section 15 is not opposed to the color reference member 21 and the reading section 16 is not opposed to the color reference member 22 (see FIGS. 2B, 3B, and 4B).

In this manner, in the embodiment, in general, using a motor for original conveyance which drives the conveyance roller 6 or the like, the color reference members move to the position in which they can be read only when the motor rotates reversely. In this manner, when the characteristics of the motor which can be easily rotated in the forward direction or the backward direction are used, additional motor to move the color reference member to opposed to the reading section, or additional drive force transmitting mechanism attached to the additional motor need not be arranged. Therefore, a space for arranging the motor and the mechanism can be reduced, and the apparatus can be reduced in size.

In the embodiment, the position of the reading unit 11 is fixed, and the moving mechanism 30 is arranged only on the reading unit 12, so that the first relative position and the second relative position can be achieved. For this reason, only one assembly of members constituting the moving mechanism 30 is satisfactorily arranged, and the number of parts can be reduced. A space for arranging a moving mechanism can also be reduced, and the apparatus can be reduced in size.

(Configuration Related to Replacement/Cleaning State of Color reference Member)

Figure 5:
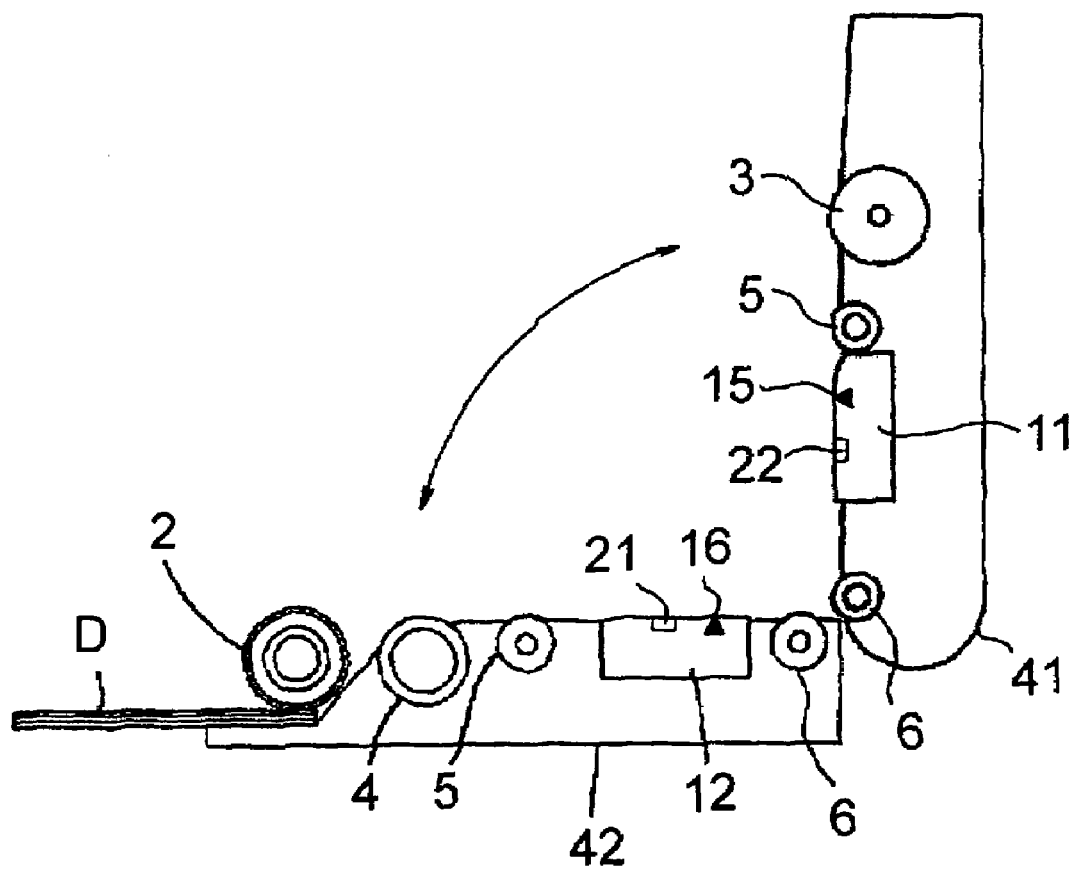
FIG. 5 is a diagram for explaining a color reference member in an exchanging/cleaning state.
Figure 6:
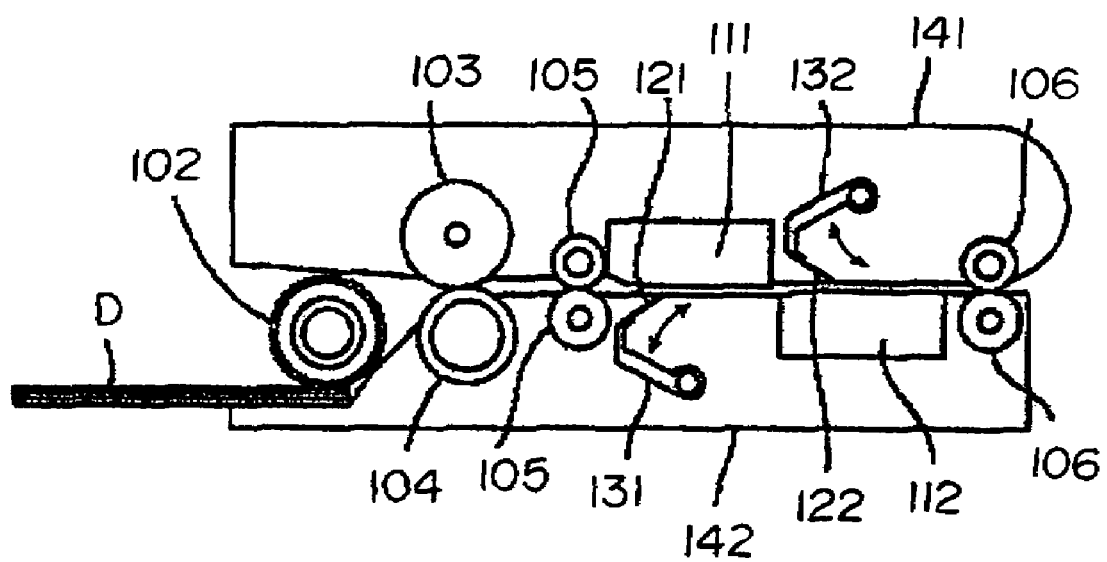
FIG. 6 is a diagram for explaining a conventional image reading apparatus.

FIG. 5 is a diagram for explaining a color reference member in an Replacement/cleaning state.

In replacing or cleaning the color reference members 21 and 22, the upper frame 41 is swung about a swinging shaft (not shown) to separate the upper frame 41 from the lower frame 42. At this time, the color reference member 21 and the color reference member 22 facing the original conveyance path are exposed.

As in a conventional technique, the color reference member is not exposed even though the original conveyance path is exposed. For this reason, in replacement of color reference members, the color reference members must be inserted into the original conveyance path.

In contrast to this, in the embodiment, the color reference members 21 and 22 always face the original conveyance path. For this reason, when the original conveyance path is exposed as shown in FIG. 5, a user can immediately touch the color reference members to make it possible to easily perform an replacement/cleaning operation.

Another Embodiment

In the embodiment described above, only the reading unit 12 is moved. However, the present invention is not limited to the embodiment. More specifically, the reading unit 11 and the reading unit 12 may be relatively moved so that the reading section 15 and the color reference member 21 are opposed to each other, and the reading section 16 and the color reference member 22 are opposed to each other, or the reading unit 11 and the reading unit 12 may be relatively moved so that the reading section 15 and the color reference member 21 are not opposed to each other, and the reading section 16 and the color reference member 22 are not opposed to each other. For example, both the reading unit 11 and the reading unit 12 may be moved, or the reading unit 12 may be fixed and only the reading unit 11 may be moved. Even in these cases, the reading unit to be moved and the frame are preferably configured such that the comb shapes of the unit and the frame are meshed with each other.

In the embodiment, the image reading surface 12a of the reading unit 12 is only moved in parallel to the image reading surface 11a of the reading unit 11. The present invention is not limited to the embodiment. More specifically, consequently, the image reading surface 12a may be moved between the first relative position and the second relative position. The image reading surface 12a may be moved in a perpendicular direction or another direction along the way.

In the embodiment, the one-way clutch is arranged on the shaft of the conveyance roller 6. However, the present invention is not limited to the embodiment. The one-way clutch may be arranged on a rotary driving shaft of another roller (for example, the pickup roller 2, the feeding roller 3, the separation roller 4, or the registration roller 5) or a rotary driving shaft having no roller. As data for shading correction, output data from the line image sensor obtained when the color reference member is read may be directly stored, or a result obtained by performing some operation to the output data may be stored.

CROSS-REFERENCE TO RELATED APPLICATION

This application claims the benefit of priority from the prior Japanese Patent Application No. 2005-54771 filed on Feb. 28, 2005 the entire contents of which are incorporated by reference herein.

What is claimed is:

1. An image reading apparatus comprising:
a conveying unit which conveys an original;
a first reading unit including a first reading section which reads one side of the original conveyed by the conveying unit;
a second reading unit including a second reading section which reads the other side of the original conveyed by the conveying unit; and
a moving mechanism which displaces relative positions of the first reading unit and the second reading unit in an original conveyance direction by using a driving force of a motor for driving the conveying unit,
wherein, the first reading unit integrally includes the first reading section and a first reference member serving as a shading reference;
the second reading unit integrally includes the second reading section and a second reference member serving as a shading reference,
said moving mechanism displaces relative positions of the first reading unit and the second reading unit to a first relative position where the first reading section is opposed to the second reference member and the second reading section is opposed to the first reference member in an operation mode for determination of a shading reference,
said moving mechanism displaces relative positions of the first reading unit and the second reading unit to a second relative position where the first reading section is not opposed to the second reference member and the second reading section is not opposed to the first reference member in an operation mode for reading the original, and
wherein said moving mechanism contains a one-way clutch that delivers force for displacement of said relative positions, said one-way clutch being arranged on a rotary driving shaft related to conveyance of the original.

2. An image reading apparatus comprising;
a conveying unit which conveys an original;
a first reading unit including a first reading section which reads one side of the original conveyed by the conveying unit;
a second reading unit including a second reading section which reads the other side of the original conveyed by the conveying unit; and
a moving mechanism which displaces relative positions of the first reading unit and the second reading unit in an original conveyance direction by using a driving force of a motor for driving the conveying unit,
wherein, the first reading unit integrally includes the first reading section and a first reference member serving as a shading reference;
the second reading unit integrally includes the second reading section and a second reference member serving as a shading reference,
said moving mechanism displaces relative positions of the first reading unit and the second reading unit to a first relative position where the first reading section is opposed to the second reference member and the second reading section is opposed to the first reference member in an operation mode for determination of a shading reference,
said moving mechanism displaces relative positions of the first reading unit and the second reading unit to a second relative position where the first reading section is not opposed to the second reference member and the second reading section is not opposed to the first reference member in an operation mode for reading the original, and
wherein the reading unit displaced by the moving mechanism has a comb shape portion at its leading end and a comb shape portion at its rear end, in an original conveyance direction, which comb shape portions are longer than a displacement of the reading unit, and wherein each comb shape portion is meshed with a frame of the apparatus having comb shapes.

* * * * *